May 16, 1939. W. D. TIPTON 2,158,442
SLEEVE VALVE ENGINE
Filed April 19, 1938 4 Sheets-Sheet 2

Inventor
William D. Tipton
By Raymond W. Colton
Attorney

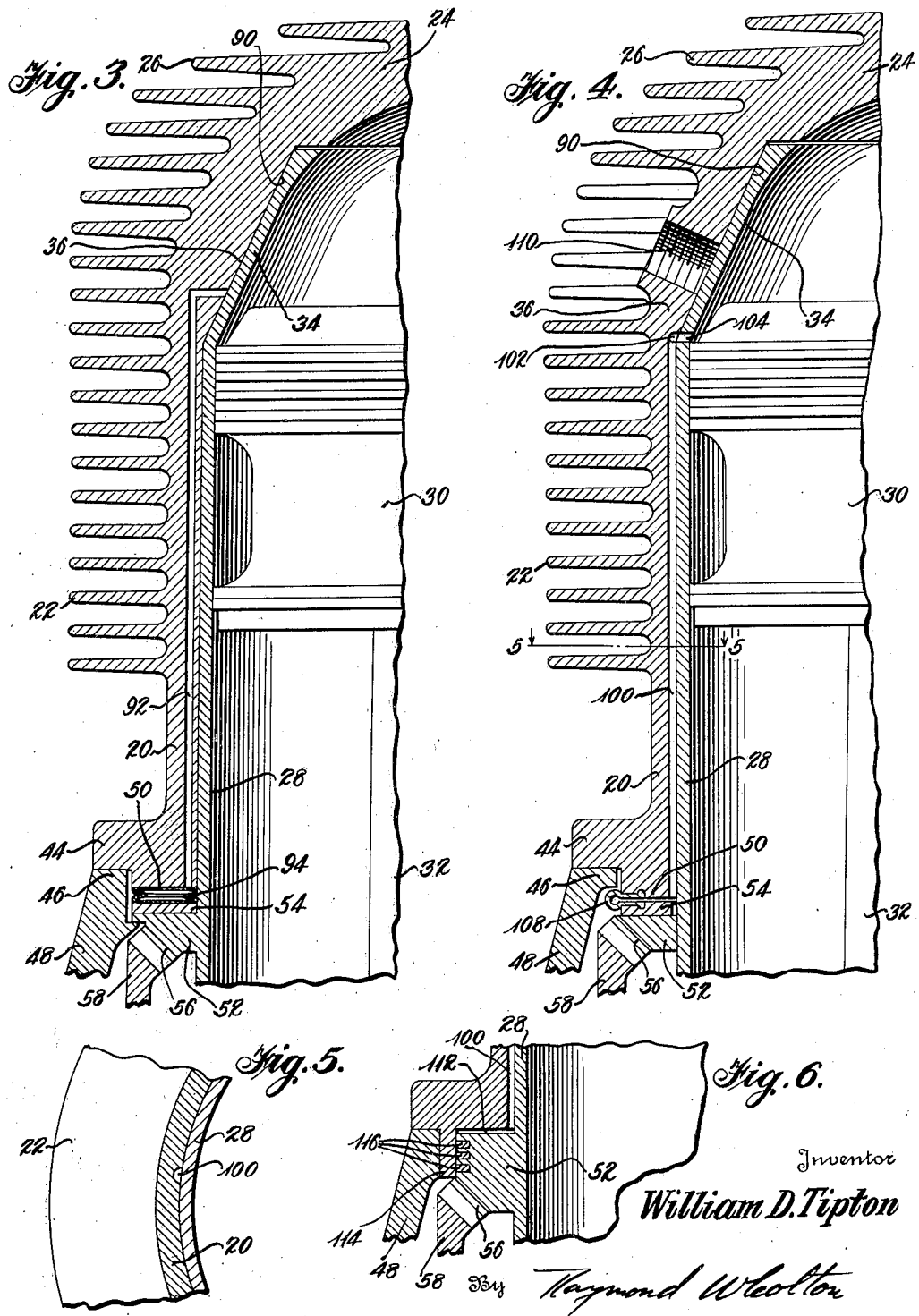

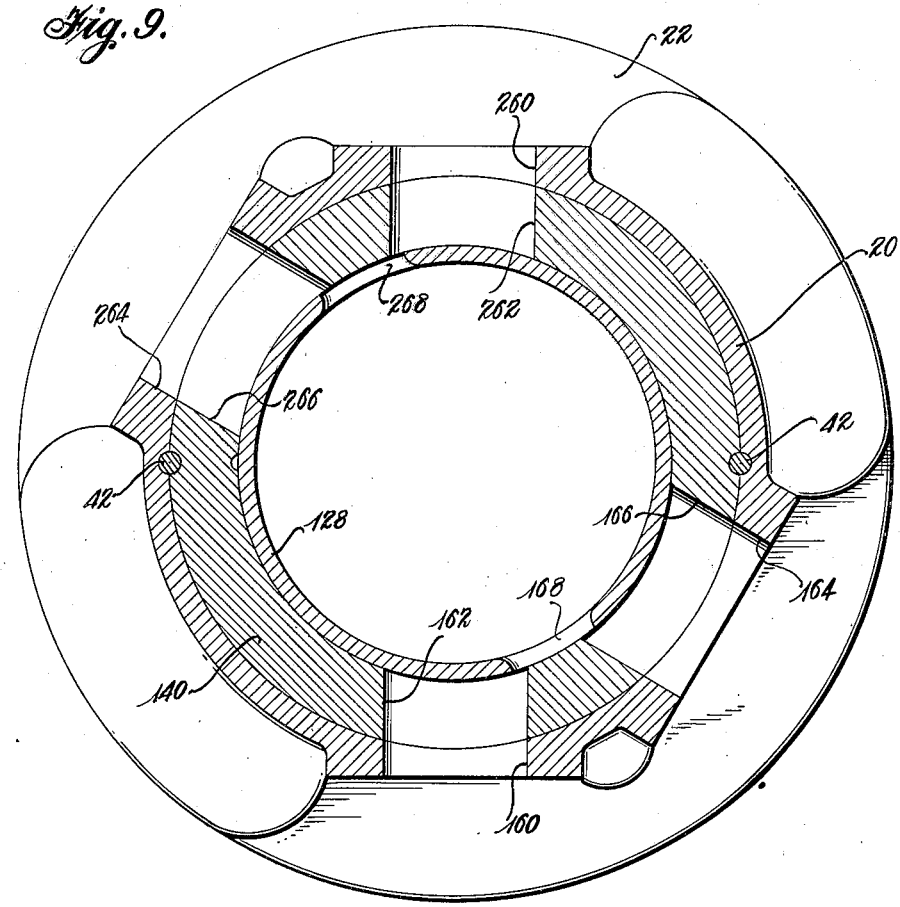

Patented May 16, 1939

2,158,442

UNITED STATES PATENT OFFICE 2,158,442

SLEEVE VALVE ENGINE

William D. Tipton, Stoneleigh, Md.

Application April 19, 1938, Serial No. 202,945

16 Claims. (Cl. 123—190)

The present invention relates to a sleeve valve engine.

It has long been recognized in the internal combustion engine art that sleeve valve operation possesses many inherent advantages which are absent from the more common poppet valve arrangements. Numbered among these advantages are the more positive valve actuation; fewer operating parts; facility of adjustment; reduction of size and weight of an engine of given horsepower; elimination of hot-spots and pre-ignition caused thereby.

On the other hand, sleeve valves have not been entirely satisfactory in the past, primarily because of frictional binding and freezing between the sleeves, pistons and cylinders on the one hand and leakage past the sleeve on the other. The binding difficulties have been mitigated to some extent by various improvements in the alloys employed in constructing the operating parts and by efforts to balance the forces responsible for the excessive friction. Attempts have been made also to overcome the leakage difficulties by using packings of various types. Until now, however, neither of these problems has been disposed of satisfactorily, and accordingly, sleeve valve engines have not enjoyed the popularity to which their advantages would seem to entitle them.

Recent trends towards higher compression ratios and higher test fuels have accentuated the need for an efficient sleeve valve engine. This is particularly true in the aviation field where increased size is necessitating larger and additional power plants and in which the factor of air resistance imposes a limit upon feasible sizes of engines of the type now in use.

In accordance with the present invention, all of the advantages inherent to sleeve valve engines have been retained and at the same time, the long existing disadvantages have been removed. The ported rotary valve sleeve of the present construction is received concentrically within the engine cylinder, and in turn receives the piston. The sleeve is provided with inner and outer frustro-conical or other convergent surfaces at its outer end or head end, the inner surface being exposed to combustion chamber pressure, and the outer surface engaging a complementary convergent surface carried by the head end of the cylinder. Intake and exhaust ports are formed through the convergent surface carried by the cylinder so that rotation of the ported sleeve within the cylinder regulates the opening and closing of the ports.

Since the inner convergent surface on the sleeve is exposed to combustion chamber pressure, there is a tendency for the sleeve to move outwardly with respect to the cylinder and bind upon the convergent surface borne by the cylinder. Accordingly, provisions have been made to counteract this tendency so that the bearing of the sleeve upon the cylinder will be only sufficient to provide an adequate seal against leakage yet insufficient to introduce excessive friction. The inner or crank end of the sleeve is provided with an annular shoulder or abutment for limiting the outward movement of the sleeve relative to the cylinder. A cooperating shoulder or abutment is likewise carried by the cylinder near its crank end, and a suitable plain or antifriction thrust bearing is interposed between these shoulders, thus restricting axial movement of the sleeve with respect to the cylinder. In accordance with one modification of the invention, the convergent surface carried by the cylinder is in the form of a separate frustro-conical sealing ring maintained in non-rotatable but axially movable relationship with the cylinder, and is subjected to the action of a spring or resilient element normally tending to force the ring into contact with the outer convergent surface of the sleeve. The spring or resilient element may be in the form of an expansible or pressure packing in communication with the cylinder through a suitable passage so that the ring will receive a force or movement proportional to the instantaneous cylinder pressures and thus oppose and compensate the tendency of the ring to move outward in response to the cylinder pressure acting directly upon its inner convergent surface. The resultant pressure between the ring and sleeve may be adjusted readily by varying the effective internal diameter of the pressure packing element.

It is also contemplated that the convergent surface carried by the cylinder may be formed integrally with the cylinder, and yet obtain a similar effect. In this case, an expansible packing element or expansible chamber in communication with the cylinder through a suitable passage may be located at a point intermediate a pair of annular bearing shoulders or abutments carried near the crank ends of the cylinder and sleeve. With such a construction, the same balancing result upon the sleeve is produced with relatively few parts, yet a seal is obtained and undue friction eliminated. By the use of pressure packings of the cup or bellows types, relative movement between the parts is permitted without loss of the necessary fluid tight joint.

It is contemplated that the valve sleeve be provided with a bevel driven gear near its lower end for cooperation with a similar driving gear mounted concentrically with the engine crank shaft and driven through suitable gearing by the crank shaft, thus eliminating the need for complicated actuating mechanisms of the type required by poppet valves. The number of ports for each cylinder and sleeve will depend upon the gearing ratio between the crank shaft and the sleeve. With the present form of construction, it is entirely feasible to provide the cylinder with an integral head since all of the parts may be assembled with facility through the crank end of the cylinder. Provision has been made for adequately lubricating all moving parts, spiral grooves having been formed on the outer wall of the sleeve in one of the modifications for delivery of crankcase oil to the head end of the cylinder and the operating parts contained therein.

A further feature of the present construction resides in isolating the spark plug or plugs from the combustion chamber by means of the sleeve until the time for ignition, thus removing another cause of hot-spots and objectionable pre-ignition.

A complete understanding of the present invention will follow from a more detailed description in conjunction with the drawings wherein:

Fig. 3 is a sectional elevation, partly broken away, showing a modification;

Fig. 4 is a sectional elevation, partly broken away, of another modification;

Fig. 5 is a fragmentary section taken along line 5—5 of Fig. 4;

Fig. 6 is a fragmentary sectional elevation of a modified detail;

Fig. 9 is a sectional plan, similar to Fig. 2, of a modification.

Figure 1:
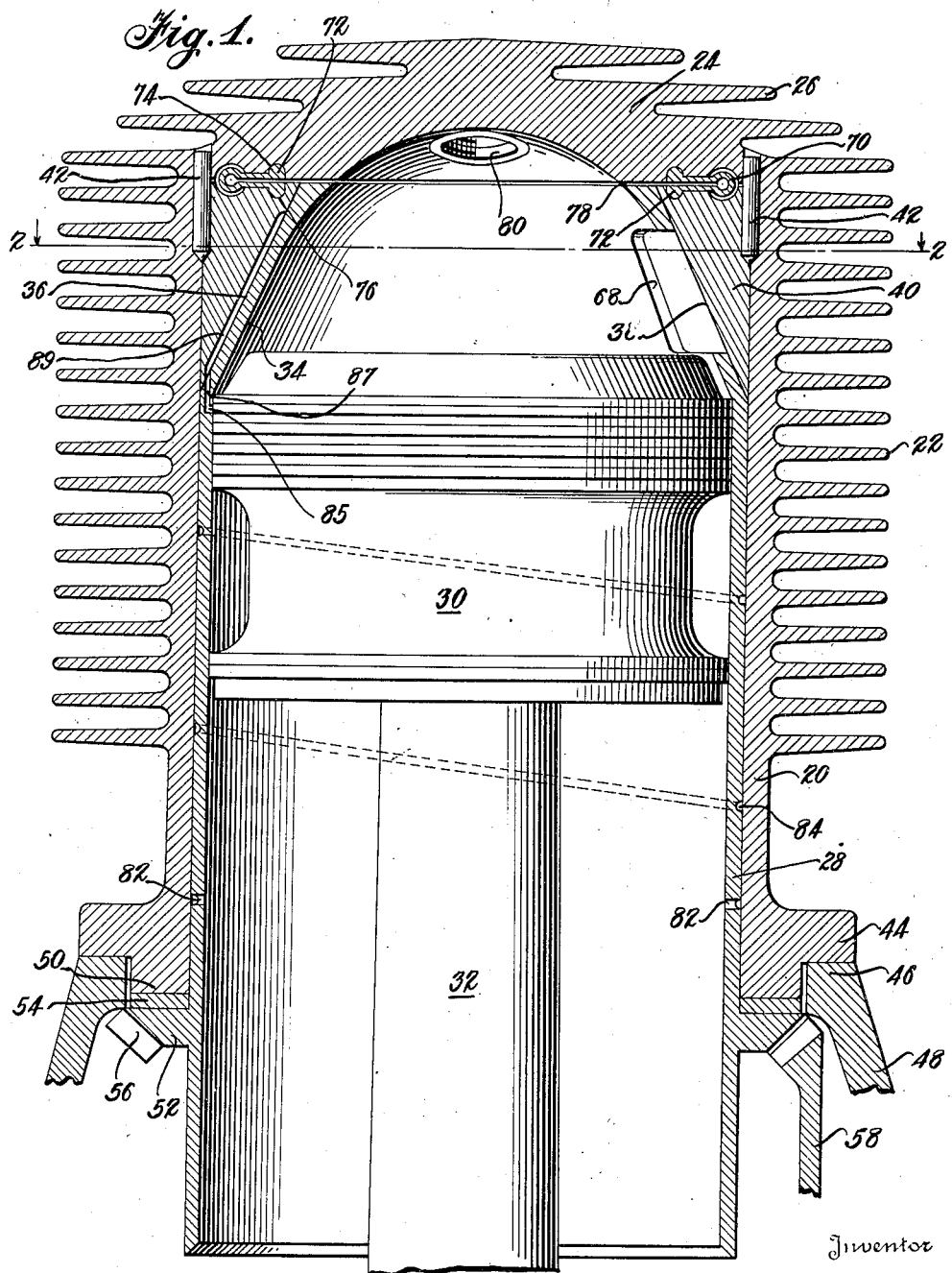
Fig. 1 is a sectional elevation illustrating one form of the invention.

For purposes of illustration, a portion of a radial air cooled engine has been depicted in the drawings as having a cylinder 20 provided with external radiating fins 22 and a cylinder head 24 likewise provided with fins 26. Whereas such an integral construction of the head and cylinder as shown is not necessary, it is nevertheless advantageous for reasons of economy, efficiency and simplicity.

A valve sleeve 28 mounted concentrically and coextensively within the cylinder, in turn receives the piston 30 which is connected to the usual crank shaft, not shown, through a connecting rod 32. Whereas the sleeve is cylindrical throughout a greater portion of its length, near its head or outer end it is provided with inner and outer convergent surfaces 34 and 36 respectively. Complementary with the outer convergent surface 36 carried by the sleeve, the cylinder is provided with a surface 38 which is similarly convergent. In the modification shown in Fig. 1 of the drawings, this convergent surface carried by the cylinder is actually formed on a separate sealing ring 40 which is slidably keyed to the cylinder by means of pins or splines 42 which prevent relative rotation between the ring and cylinder yet permit relative axial movement.

The inner or crank end of the cylinder is provided with a flange 44 received and supported upon a mating flange 46 formed on the engine crank case 48. In stepped relationship with the flange 44, the cylinder is provided with an annular flange or abutment 50 for cooperation with an annular flange or abutment 52 carried by the sleeve near its crank end. Interposed between the cooperating cylinder and sleeve flanges, a suitable thrust bearing 54 is provided for supporting the load resulting from the tendency of the sleeve to move outwardly with respect to the cylinder. The periphery of the sleeve flange 52 is provided with bevel teeth to define an annular bevel gear 56 for meshing relationship with a bevel gear 58 intended to be fixed upon the crank shaft, thus to positively drive the sleeve from the crank shaft.

Figure 2:
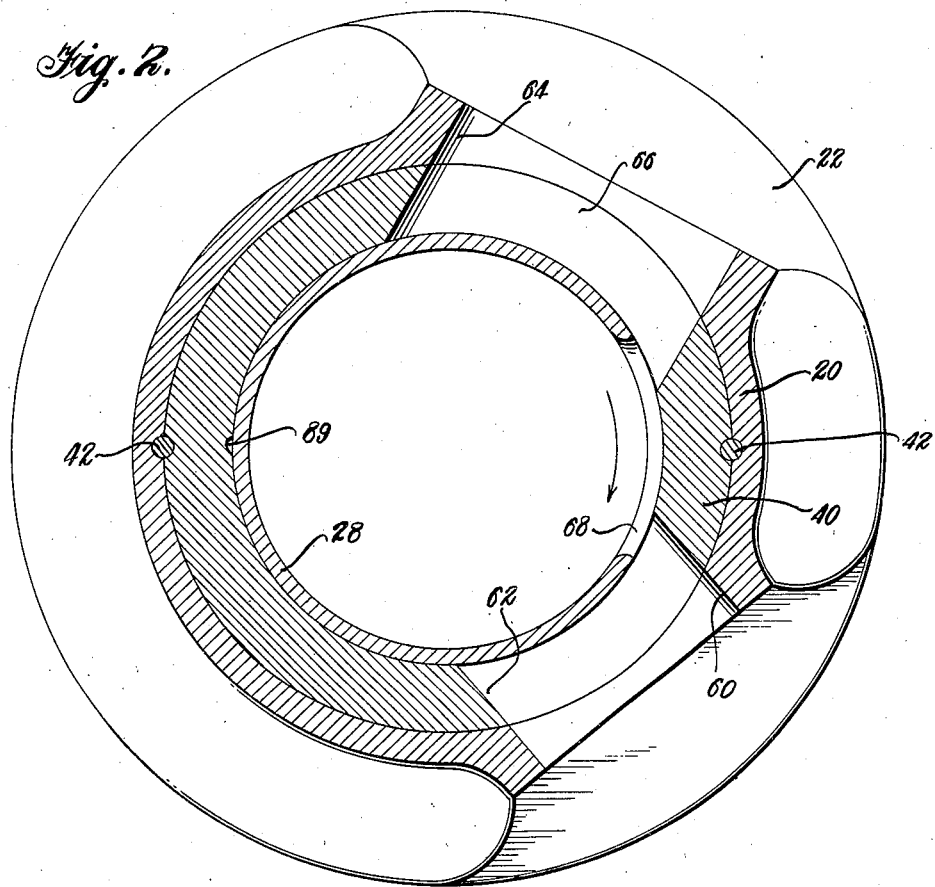
Fig. 2 is a sectional plan taken along line 2—2 of Fig. 1.

Referring particularly to Figs. 1 and 2 of the drawings, the cylinder and sealing ring are provided with registering intake ports 60 and 62 respectively, and with registering exhaust ports 64 and 66 respectively. These intake and exhaust ports are controlled by the valve sleeve rotated in predetermined timing relationship with the crank shaft, by means of a port 68 formed through the convergent portion of the sleeve.

In order to produce an effective seal between the moving parts in the vicinity of the ports, a resilient or spring like element 70 is interposed between the cylinder head and the sealing ring, as shown in Fig. 1, which exerts a normal force tending to seat the convergent surface of the sealing ring upon the outer convergent surface of the sleeve. The resilient element has been shown as an expansible or inflatable packing having enlarged ends, or more precisely, enlarged inner peripheries 72 received in complementary annular grooves 74 and 76 formed in the cylinder head and sealing ring respectively for assuring retention of the packing element in position. Communication from the cylinder is established to the expansible packing 70 through an annular passage 78 defined by properly spacing the sleeve and sealing ring from the head of the cylinder. Where electrical ignition is employed, the spark plug may be received in a suitable threaded aperture 80 formed in the cylinder head.

The convergent surfaces shown and described on the inner and outer walls of the sleeve and the complementary surface of the sealing ring are preferably in the form of substantially frusto-conical surfaces, but other curvatures or inclinations may be utilized which will be productive of similar results.

In order to lubricate the sleeve and sealing ring, a suitable number of apertures 82 may be formed through the wall of the sleeve for communication with one or more spiral grooves 84 formed on the sleeve periphery. Oil will thus be splash fed to these parts from the crank case by the cranks, bearings and connecting rods. In addition, the upper end of the sleeve may contain a radial aperture 85 communicating with an axial passage 87 extending upward into registry with an axial groove 89 formed in the surface of the sealing ring. In this manner, oil will be forced between the sleeve and sealing ring by movement of the piston and by combustion chamber pressure.

Since the inner convergent or frusto-conical surface formed on the valve sleeve is exposed to combustion chamber pressure, during the compression and power strokes, there will be a tendency for the sleeve to move outwardly with respect to the cylinder, the force of which is taken up by the thrust bearing 54 formed between the cooperating flanges on the cylinder and sleeve. The expansible packing is also exposed to cylinder pressure so that fluid passing through the passage 78 tends to expand the packing 70, thus imposing an inwardly directed force upon the sealing ring.

This force exerted by the expansible packing tends to improve the seal between the sealing ring and the sleeve. It will be realized that the pressure of the sealing ring on the sleeve due to combustion chamber pressure may be regulated by varying the degree of convergence on the surface of the sleeve, and/or by varying the effective internal diameter of the expansible packing 70. As already stated, the packing 70 is preferably a resilient or spring like element having a normal tendency to expand due to its own resiliency and thus create a constant force upon the sealing ring to maintain it in fluid tight relationship with the sleeve.

In the modifications shown in Figs. 3 and 4 of the drawings, the convergent surface carried by the cylinder, for cooperation with the outer convergent surface on the sleeve 28, is integral with the cylinder. The convergent surface 90 carried by the cylinder in these modifications is maintained in sealing relationship with the sleeve entirely by the effect of the combustion chamber pressure upon the inner convergent surface of the sleeve, tending to move the sleeve outwardly with respect to the cylinder.

In the construction shown in Fig. 3 of the drawings, the wall of the cylinder 20 is provided with a passage 92 which communicates with the combustion chamber through the sleeve port 68 during the compression and power strokes. This passage 92 leads to an expansible bellows 94 interposed between the bearing 54 and the shoulder 50 formed on the crank end of the cylinder. Accordingly, when the pressure of the combustion chamber is high, as occurs during the compression and power strokes, this pressure will be communicated through the passage 92 to the expansible bellows 94 tending to move the sleeve inwardly with respect to the cylinder in opposition to the tendency of the sleeve to move outwardly because of the forces acting directly upon the internal convergent surface 34. The degree of balance between these forces may be regulated by varying the effective internal diameter of the expansible packing or bellows 94.

In the construction shown in Fig. 4 of the drawings, one or more axial grooves 100 are formed in the inner surface of the cylinder wall in communication with an annular groove 102 likewise formed in the cylinder wall and communicating with the combustion chamber through a suitable number of ports 104 provided through the valve sleeve 28 in the vicinity of its convergent portion. Interposed between the bearing 54 and the cylinder abutment 50, there is provided an expansible packing 108 similar to the packing 70 described with respect to Fig. 1 of the drawings. This packing 108 is in constant communication with the combustion chamber through the ports 104, annular grooves 102 and axial grooves 100. Hence, when pressure within the combustion chamber tends to exert an outward movement upon the sleeve 28, the same pressure acts upon the expansible packing 108 tending to oppose the outward movement. Thus as in the former cases, by properly designing the parts, the sleeve may be balanced within the cylinder so as to obtain an adequate seal without undue friction. The expansible packing in this case may or may not be resilient in nature.

It is also contemplated in the form shown in Fig. 4 that the spark plug openings 110 be transversely arranged so as to be cut off from the combustion chamber by the valve sleeve until the ignition period arrives. In this manner, the hot metal and insulation of the plugs will not be exposed to the combustion chamber prematurely and there will be no danger of pre-ignition from this source.

Instead of utilizing a pressure packing of the type shown in Fig. 4 of the drawings, it is also contemplated to use a different type of expansible chamber for accomplishing the same purpose as typified by the showing in Fig. 6 of the drawings. Here the axial groove or grooves 100 communicate with an expansible chamber 112 defined by properly spacing the flanges 44 and 52 carried by the cylinder and sleeve respectively. In order to seal the expansible chamber, a depending flange 114 may be formed on the lower end of the cylinder to serve in turn as a cylinder for the shoulder 52 on the sleeve which acts as the piston. A plurality of annular packing rings 116 may be interposed between the depending flange or cylinder 114 to seal it with respect to the sleeve 28.

Figure 7:
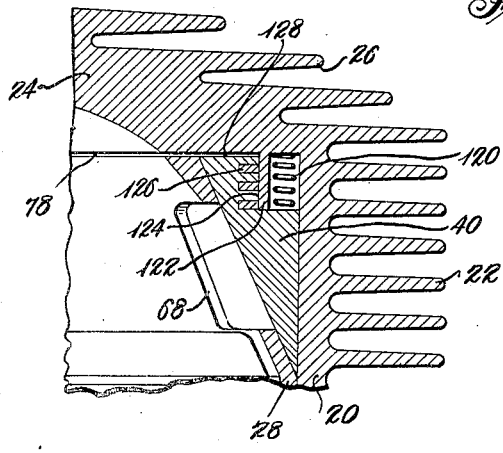
Fig. 7 is a fragmentary elevation in section of another modified detail.

An alternate form of sealing ring for cooperation with the sleeve is shown in Fig. 7 of the drawings wherein an expansible chamber is again utilized as contrasted to the expansible packing shown for example in Fig. 1 of the drawings. In this construction, the sealing ring is normally urged inwardly by means of a helical spring 120 interposed between the cylinder head 24 and the sealing ring 40. This spring maintains the sealing ring in a constant fluid-tight relationship with the sleeve. A depending flange 122 carried by the cylinder head, is maintained in fluid tight relationship with the shoulder 124 formed on the sealing ring, by means of annular packing elements 126 which are seated in suitable grooves formed on the shoulder of the sealing ring. Accordingly, during the compression and power strokes, fluid under pressure from the combustion chamber will enter through the annular passage 78 formed by the spacing of the sleeve and sealing ring from the cylinder head, into the expansible chamber 128, tending to force the sealing ring into fluid tight contact with the outer convergent surface of the sleeve.

Figure 8:
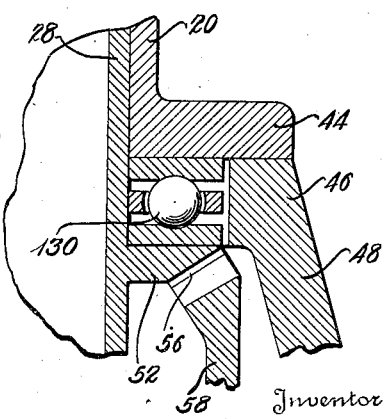
Fig. 8 is a fragmentary sectional elevation of a modified form of bearing.

In lieu of the plain thrust bearing for interposition between the cooperating flanges carried by the cylinder and sleeve respectively, an antifriction bearing 130 of the type clearly depicted in Fig. 8 of the drawings may be substituted.

In Fig. 9 of the drawings, a modification has been depicted wherein the valve sleeve 128 is intended to rotate at one-half the speed contemplated for the form shown in Fig. 2. The sleeve will be geared accordingly and the necessary additional ports will be provided. The sleeve in this instance will contain two ports 168 and 268 for controlling the intake ports 160 and 260 and exhaust ports 164 and 264 formed in the cylinder. Registering with these cylinder ports respectively are the intake ports 162 and 262 and the exhaust ports 166 and 266 formed through the sealing ring 140. In a similar manner, other timing ratios may be provided for the sleeve rotation, provided the port arrangement is modified accordingly.

The modifications described in the foregoing are clearly intended as illustrations of the invention. The teaching can be applied in the various other ways as will be suggested to a worker skilled in the art, once having the advantage of the present disclosure. Consequently, the scope of the invention is to be construed in accordance with the following claims.

I claim:

1. An internal combustion engine comprising a cylinder defining a combustion chamber, a valve sleeve in said cylinder subject to outward movement by pressure within the combustion chamber, a thrust bearing between said cylinder and sleeve opposing said outward movement, a sealing ring for said sleeve axially movable in said cylinder, complementary convergent surfaces carried by said ring and sleeve, said convergent surface of said ring containing intake and exhaust ports.

2. An internal combustion engine comprising a cylinder, a valve sleeve in said cylinder, a convergent surface carried by said sleeve, a sealing ring having a surface complementary to that of said sleeve between said sleeve surface and said cylinder, said sealing ring containing intake and exhaust ports.

3. An internal combustion engine comprising a cylinder, a valve sleeve in said cylinder, a convergent surface carried by said sleeve, an axially movable sealing ring between said cylinder and said sleeve, a convergent surface on said ring for engagement with that of said sleeve, said ring containing intake and exhaust ports.

4. An internal combustion engine comprising a cylinder, a valve sleeve in said cylinder, a sealing ring for said sleeve, a convergent surface carried by said ring, a complementary convergent surface carried by said sleeve, said convergent surface of said ring containing intake and exhaust ports, means for urging said surfaces into fluid tight relationship and means supporting said sleeve against outward thrust.

5. An internal combustion engine comprising a cylinder, a valve sleeve in said cylinder, a sealing ring for said sleeve, cooperating transversely directed surfaces carried by said ring and sleeve, means for urging said surfaces into contact and a thrust bearing for limiting outward movement of said sleeve, said surfaces containing intake and exhaust ports.

6. An internal combustion engine comprising a cylinder, a valve sleeve in said cylinder, cooperating transversely directed surfaces carried by said cylinder and sleeve, ports formed in said surfaces and means subject to fluid pressure in said cylinder for relieving friction between said surfaces.

7. An internal combustion engine comprising a cylinder, a valve sleeve in said cylinder, cooperating transversely directed surfaces carried by said cylinder and sleeve, ports formed in said surfaces and expansible packing means in communication with said cylinder for relieving friction between said surfaces.

8. An internal combustion engine comprising a cylinder, a valve sleeve in said cylinder, a transversely directed surface on said sleeve exposed to cylinder pressure, cooperating transversely directed surfaces on said sleeve and cylinder containing ports, and means in communication with said cylinder for relieving friction between said cooperating surfaces.

9. An internal combustion engine comprising a cylinder, a valve sleeve in said cylinder, said sleeve having its outer end formed with inner and outer convergent surfaces, said inner surface being exposed to cylinder pressure, a sealing ring in said cylinder surrounding said outer surface and having a surface complementary therewith, said surfaces containing ports, and means for limiting outward movement of said sleeve due to cylinder pressure.

10. An internal combustion engine comprising a cylinder, a valve sleeve in said cylinder, said sleeve having its outer end formed with inner and outer convergent surfaces, said inner surface being exposed to cylinder pressure, a sealing ring in said cylinder surrounding said outer surface and having a surface complementary therewith, one of said surfaces containing a port and means urging said complementary surfaces into fluid tight relationship.

11. An internal combustion engine comprising a cylinder, a valve sleeve in said cylinder, said sleeve having its outer end formed with inner and outer convergent surfaces, said inner surface being exposed to cylinder pressure, a sealing ring in said cylinder surrounding said outer surface and having a surface complementary therewith, one of said surfaces containing a port, and cylinder pressure actuated means for forcing said sealing ring into fluid tight relationship with said sleeve.

12. An internal combustion engine comprising a crank case, a cylinder, a valve sleeve in said cylinder, said sleeve having its outer end formed with inner and outer convergent surfaces, said inner surface being exposed to cylinder pressure, a sealing ring in said cylinder surrounding said outer surface and having a surface complementary therewith, one of said surfaces containing a port, and means communicating with said crank case for lubricating said sealing ring.

13. An internal combustion engine comprising a cylinder, a valve sleeve in said cylinder, said sleeve having its outer end formed with inner and outer convergent surfaces, said inner surface being exposed to cylinder pressure, a sealing ring in said cylinder surrounding said outer surface, and having a surface complementary with said outer convergent surface of said sleeve, one of said surfaces containing a port and resilient means urging said complementary surfaces into fluid tight relationship.

14. An internal combustion engine comprising a cylinder, a valve sleeve in said cylinder, said sleeve having its outer end formed with inner and outer convergent surfaces, said inner surface being exposed to cylinder pressure, a sealing ring in said cylinder surrounding said outer surface, and having a surface complementary with said outer convergent surface of said sleeve, one of said surfaces containing a port and expansible means urging said complementary surfaces into fluid tight relationship.

15. An internal combustion engine comprising a cylinder, a valve sleeve in said cylinder, said sleeve having its outer end formed with inner and outer convergent surfaces, said inner surface being exposed to cylinder pressure, a sealing ring in said cylinder surrounding said outer surface and having a surface complementary with said outer convergent surface of said sleeve, one of said surfaces containing a port and expansible packing means responsive to cylinder pressure for urging said complementary surfaces into fluid tight relationship.

16. An internal combustion engine comprising a cylinder, a valve sleeve in said cylinder, said sleeve having its outer end formed with inner and outer convergent surfaces, said inner surface being exposed to cylinder pressure, a sealing ring in said cylinder surrounding said outer surface, and having a surface complementary with said outer convergent surface of said sleeve, one of said surfaces containing a port and a pressure actuated packing means urging said complementary surfaces into fluid tight relationship.

WILLIAM D. TIPTON.